(12) United States Patent
Yamashita

(10) Patent No.: US 6,418,114 B1
(45) Date of Patent: Jul. 9, 2002

(54) OPTICAL DISK CARTRIDGE

(75) Inventor: Tatsumaro Yamashita, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/478,699

(22) Filed: Jan. 6, 2000

(30) Foreign Application Priority Data

Jan. 8, 1999 (JP) ............................................. 11-002686
Apr. 27, 1999 (JP) ............................................. 11-120675

(51) Int. Cl.[7] ............................................. G11B 23/03
(52) U.S. Cl. ...................................................... 369/291
(58) Field of Search ........................... 360/133; 369/291, 369/289, 77.1, 77.2

(56) References Cited

U.S. PATENT DOCUMENTS

| | | | | |
|---|---|---|---|---|
| 4,443,872 A | * | 4/1984 | Kirschner | 369/77.2 |
| 5,063,554 A | * | 11/1991 | Uehara | 369/77.2 |
| 5,084,855 A | * | 1/1992 | Kobayashi et al. | 369/752 |
| 5,088,085 A | * | 2/1992 | Uehara | 369/77.2 |
| 5,164,935 A | * | 11/1992 | Simegi et al. | 369/77.2 |
| 5,465,246 A | * | 11/1995 | d'Arc | 369/77.2 |
| 5,467,235 A | * | 11/1995 | Watanabe | 360/99.06 |
| 5,532,994 A | * | 7/1996 | Inoue et al. | 369/77.2 |
| 5,606,547 A | * | 2/1997 | Otsuka et al. | 369/291 |
| 5,694,278 A | * | 12/1997 | Sumner | 360/133 |
| 5,715,233 A | * | 2/1998 | Yoshida et al. | 369/289 |
| 5,870,368 A | * | 2/1999 | Nakamichi | 369/77.1 |
| 5,903,541 A | | 5/1999 | Mizutani et al. | |
| 5,923,509 A | * | 7/1999 | Takahashi et al. | 360/133 |
| 5,936,935 A | * | 8/1999 | Hanakawa et al. | 369/291 |
| 5,953,187 A | * | 9/1999 | Uwabo et al. | 360/133 |
| 6,002,660 A | * | 12/1999 | Ikegame | 369/77.2 |
| 6,205,114 B1 | * | 3/2001 | Takekoh et al. | 369/291 |
| 6,243,355 B1 | * | 6/2001 | Ikebe et al. | 369/291 |

FOREIGN PATENT DOCUMENTS

| | | |
|---|---|---|
| EP | 0 335 461 A1 | 10/1989 |
| EP | 0 838 819 A1 | 4/1998 |
| EP | 0 902 428 A2 | 3/1999 |
| EP | 0 921 526 A1 | 6/1999 |
| EP | 0 959 471 A1 | 11/1999 |
| EP | 0 961 272 A1 | 12/1999 |
| EP | 0 962 933 A2 | 12/1999 |
| GB | 2 272 990 A | 6/1994 |

* cited by examiner

Primary Examiner—David L. Ometz
(74) Attorney, Agent, or Firm—Brinks Hofer Gilson & Lione

(57) ABSTRACT

An optical disk cartridge includes a casing having an accommodating section, and a holder capable of insertion and removal of a disk into and from the accommodating section while holding the disk. In the optical disk cartridge, the holder is provided with an incorrect-insertion-preventing section for preventing incorrect insertion of the holder into said casing with respect to top and bottom faces thereof.

7 Claims, 17 Drawing Sheets

OPTICAL DISK CARTRIDGE

BACKGROUND OF THE INVENTION

1. Field of the Invention

The present invention relates to an optical disk cartridge into which an optical disk can be inserted and removed.

2. Description of the Related Art

FIG. 35 shows a conventional optical disk cartridge. Referring to FIG. 35, a casing 21 for accommodating therein an optical disk D has an accommodating section 21a and an opening provided in one side face thereof for inserting and removing the disk D into and from the cartridge.

A lid 22 having tongues 22a is attached to the opening 21b so as to be opened and closed.

In the insertion and removal of the disk D, top and bottom faces of the disk D are sandwiched by the tongues 22a so that the disk D is inserted into and removed from the accommodating section 21a. This prevents the disk D from being contaminated by fingerprints and the like.

In such a conventional optical disk cartridge, since the lid 22 has a symmetrical shape, the lid 22 may be incorrectly attached to the casing 21 with respect to the top and bottom faces.

In addition, in the conventional optical disk cartridge, the top and bottom faces of the lid 22 cannot be distinguished at a glance.

Furthermore, in accordance with the incorrect insertion of the lid 22, the disk D may be incorrectly inserted with respect to the top and bottom faces thereof.

SUMMARY OF THE INVENTION

Accordingly, it is an object of the present invention to provide an optical disk cartridge into which a disk can be inserted and removed, and in which incorrect insertion of the disk with respect to the top and bottom faces thereof can be prevented.

In accordance with the present invention, there is provided an optical disk cartridge including: a casing having an accommodating section; and a holder capable of insertion and removal of a disk into and from the accommodating section while holding the disk; wherein the holder is provided with an incorrect-insertion-preventing section for preventing incorrect insertion of the holder into the casing with respect to top and bottom faces thereof.

In the optical disk cartridge of the present invention, the incorrect-insertion-preventing section is formed by providing a recess in one of the holder and the casing, and providing a projection in the other of the holder and the casing.

In the optical disk cartridge of the present invention, the holder may have a base part exposed from the casing, the incorrect-insertion-preventing section may be provided on the base part, and the incorrect-insertion section may be exposed from the casing so as to be distinguished from the outside of the casing.

In the optical disk cartridge of the present invention, the incorrect-insertion-preventing section may be formed using a side wall of the casing in the thickness direction thereof.

The incorrect-insertion-preventing section of the casing may be provided on a side wall of the casing forming the accommodating section of the casing, and the incorrect-insertion-preventing section of the holder may be provided on a side portion opposing the side wall.

The casing may have a top cover and a bottom cover forming top and bottom sides, the incorrect-insertion-preventing section of the casing engageable with the incorrect-insertion-preventing section of the holder may be provided on one of the top cover and the bottom cover, a space through which the incorrect-insertion-preventing section of the holder is passable may be provided between the top of the incorrect-insertion-preventing section of the casing and the top cover or the bottom cover, and the holder may be prevented from being incorrectly inserted with respect to the top and bottom faces thereof by a state where the incorrect-insertion-preventing section of said holder is passable through the space and a state where the incorrect-insertion-preventing section of the holder engages with the incorrect-insertion-preventing section of the casing.

In the optical disk cartridge of the present invention, the holder may have a base part, an elastic arm provided with a slit so that there is elasticity on the base part; and a convex fallout-preventing section provided on a side portion of the elastic arm. In addition, the fallout-preventing section may passe over the incorrect-insertion-preventing section of the casing to engage with the incorrect-insertion-preventing section of the casing to thereby prevent the holder from falling out of the casing.

The casing may be provided with a stopper section so that, in the insertion of the holder into said casing, after the fallout-preventing section has passed over the incorrect-insertion-preventing section of the casing, the holder abuts against the stopper section so as to prevent further insertion of the holder.

The incorrect-insertion-preventing section of the holder may abut against the stopper section so as to prevent further insertion of the holder.

Top and bottom faces of the base part may be formed with identification marks for identifying top and bottom faces.

Each of the identification marks may be formed by a device for identifying the top and bottom faces tactilly.

Each of the identification marks may consist of an elliptical recess, and projections formed in the recess with different numbers for the top and bottom faces.

DESCRIPTION OF THE PREFERRED EMBODIMENTS

Figure 1:
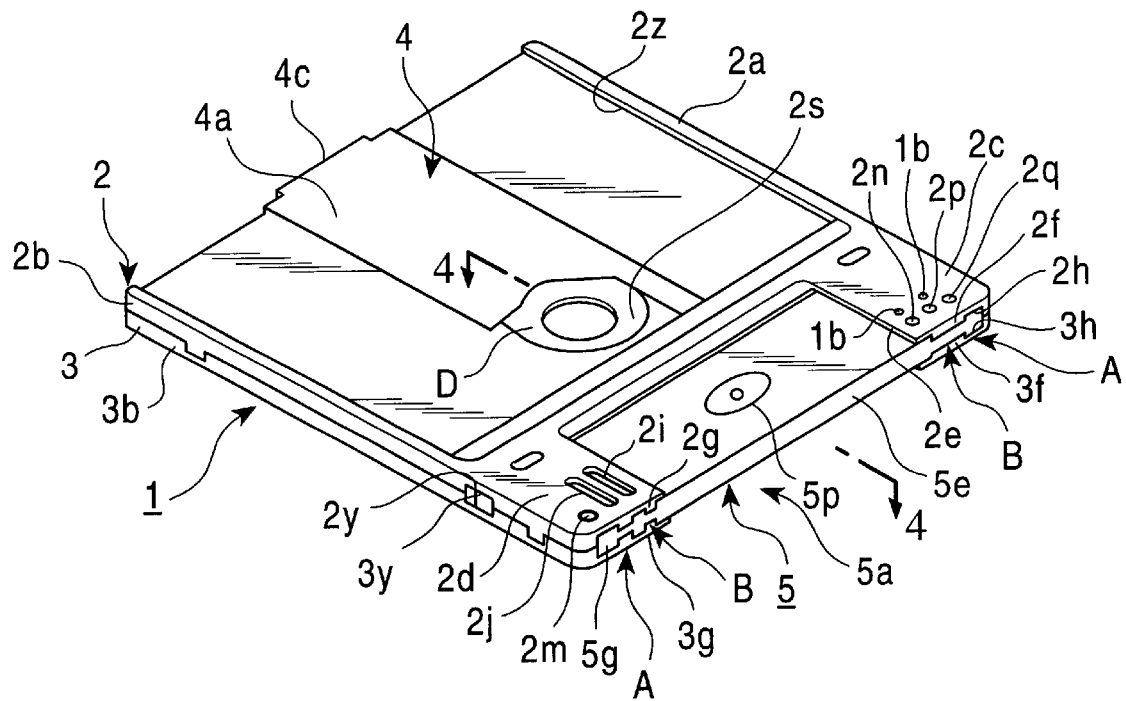
FIG. 1 is a perspective view showing an optical disk cartridge according to a first embodiment of the present invention.

While optical disk cartridges exist for DVD-RAM disks of 120 mm in diameter, optical disk cartridges for DVD-RAM disks of 80 mm in diameter are being researched.

The present invention provides an optical disk a cartridge for 80 mm disks which can be applied to optical disk cartridges for 120 mm disks, and to a disk driving apparatus for the optical disk cartridge for 120 mm disks.

A first embodiment of an optical disk cartridge of the present invention applied to the 80-mm disks used for the DVD-RAM will now be described with reference to FIGS. 1 to 29.

A casing 1 consists of top and bottom covers 2 and 3 which are molded articles made of synthetic resin.

Since the top and bottom covers 2 and 3 have nearly the same construction, only the bottom cover 3 will be described in detail. Regarding the top cover 2, portions thereof which differ from those of the bottom cover 3 will also be described.

As shown in FIGS. 1 to 15, the bottom cover 3 includes a planar wall 3a, a pair of side walls 3b provided on the left and right of the wall 3a, and a rectangular cutout 3e which is formed in front of the wall 3a with spaces 3c and 3d remaining between the side walls 3b.

In addition, the bottom cover 3 includes front walls 3f and 3g provided at left and right front positions corresponding to the spaces 3c and 3d. The front walls 3f and 3g are provided with recesses 3h of different shapes at positions exposed to the outside so as to form incorrect-insertion-preventing sections A.

As shown in FIGS. 11 to 15, the space 3c of the wall 3a is provided with operating slots 3i and 3j, and a breakable blocking part 3m consisting of a projection and having thin-walled parts 3k at the base portion thereof which are sequentially arranged side by side.

The space 3d of the wall 3a is provided with a circular discrimination hole 3n for discriminating whether or not information can be written on the disk, a circular discrimination hole 3p for discriminating whether or not the checking for defective regions has been completed, and a circular blocking part-removing hole 3q which are sequentially arranged side by side. The discrimination hole 3n and the operating slot 3i, the discrimination hole 3p and the operating slot 3j, and the hole 3q and the blocking part 3m are provided at positions equidistant from the center of the wall 3a.

The bottom cover 3 includes a spring receiver 3r formed on the rear thereof, a substantially circular clamping window 3s formed in the center thereof, a rectangular reading and writing window 3t provided continuously with the clamping window 3s, projections 3u formed on the border of the clamping window 3s and the reading and writing windows 3t so as to narrow the width of the window 3t, an arcuate rim 3v provided on the rear of the inside of the bottom cover 3, regulating parts 3w connected to both ends of the rim 3v and extending rearward inclined relative to the side walls 3b, a base 3x provided over the central portion of the inside of the bottom cover 3, a pair of latching recesses 3y provided at opposing positions of the side walls 3b, and a rectangular recessed part 3z provided on the back of the wall 3a of the bottom cover 3.

Figure 11:
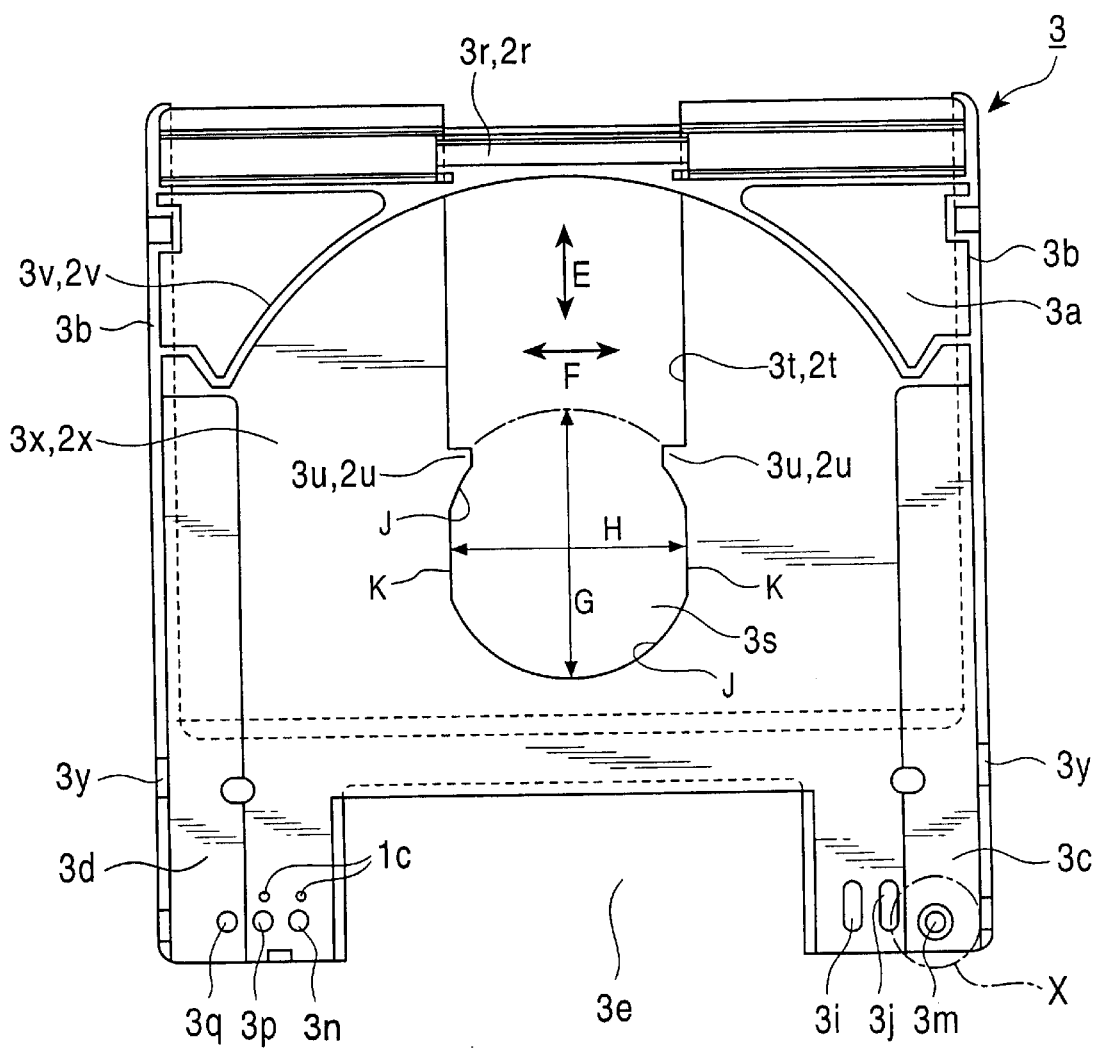
FIG. 11 is a plan view of a bottom cover in the optical disk cartridge according to the first embodiment of the present invention.
Figure 12:
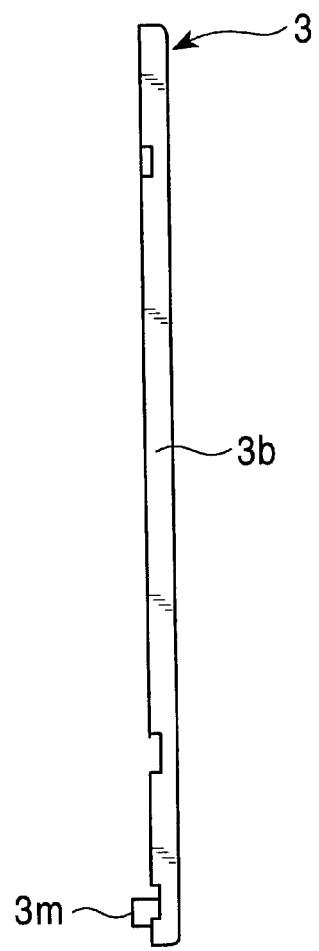
FIG. 12 is a side view of the bottom cover.
Figure 13:
FIG. 13 is a front view of the bottom cover.
Figure 14:
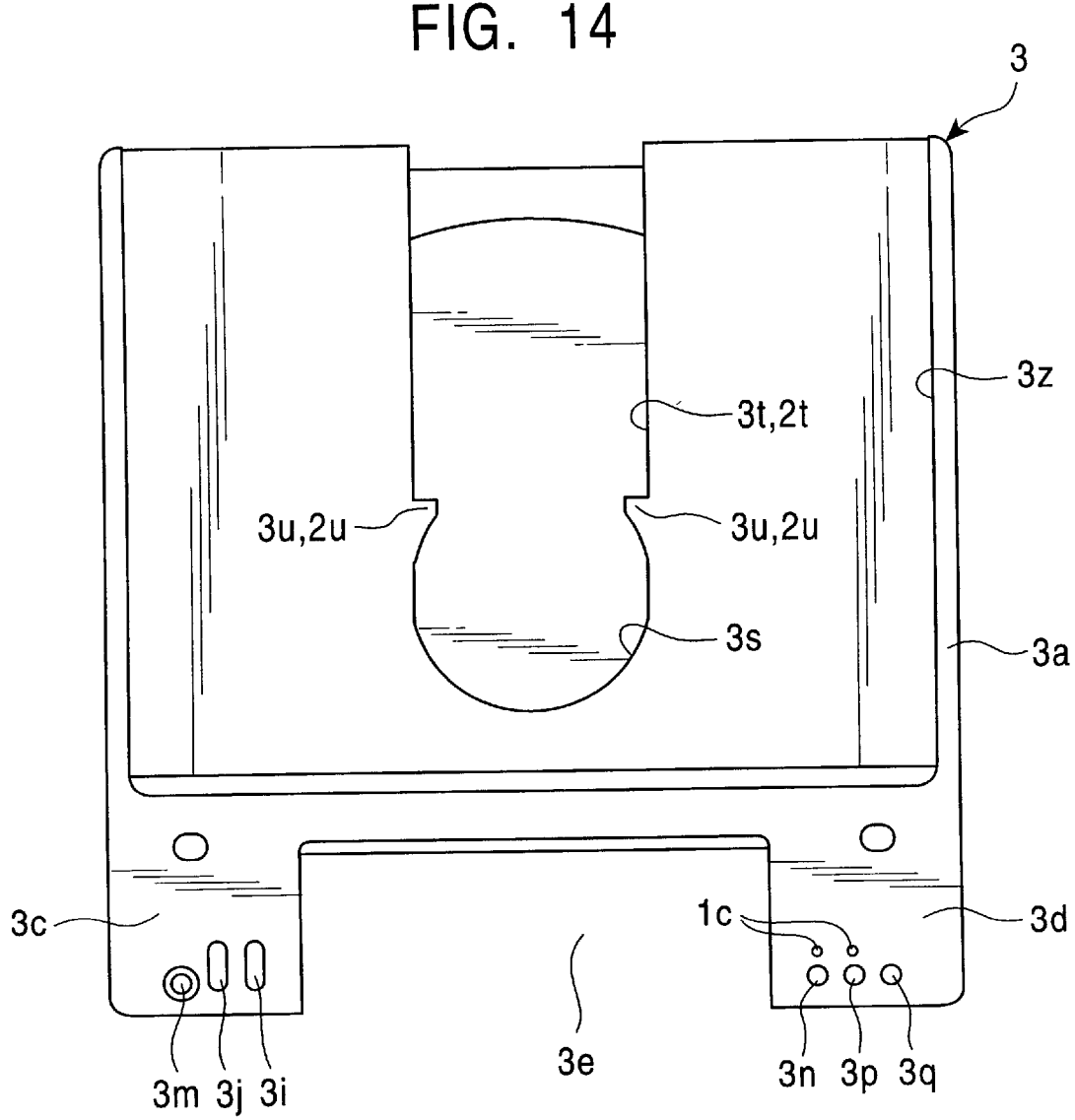
FIG. 14 is a rear elevation view of the bottom cover.
Figure 15:
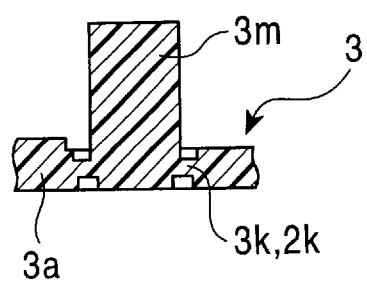
FIG. 15 is an enlarged sectional view of a portion represented by X in FIG. 11.

Referring to FIG. 11, in the window 3t for reading and writing, an optical head linearly moves so as to read and write information from and on the disk D. When the direction of movement of the optical head is taken as a vertical direction E, and the direction orthogonal to the vertical direction E is taken as a horizontal direction F, the clamping window 3s is formed by arcuate parts J each having a radius of 14 mm from the center C of the window 3s (the same as the center C of the disk D), i.e., having a diameter G of 28 mm in the vertical direction E, and a pair of linear parts K having a width of 27.4 mm in the horizontal direction F and parallel to the direction of movement of the optical head, i.e., the vertical direction E. The arcuate parts J connect the linear parts K.

That is, the clamping window 3s has a diameter (28 mm) in the vertical direction E which is larger than the width (27.4 mm) in the horizontal direction F.

The same construction applies to a clamping window 2s of the top cover 2, and the diameter G may preferably be ±2 mm of 28 mm, and the width H may preferably be ±2 mm of 27.4 mm due to the relationship between the entire width of the casing 1 for the 80 mm disk and a motor (described hereinbelow) of the disk driving apparatus for the 120 mm disk.

The details of the top cover 2 are omitted, and only some of the components and the reference numerals thereof are shown in the figures.

Figure 2:
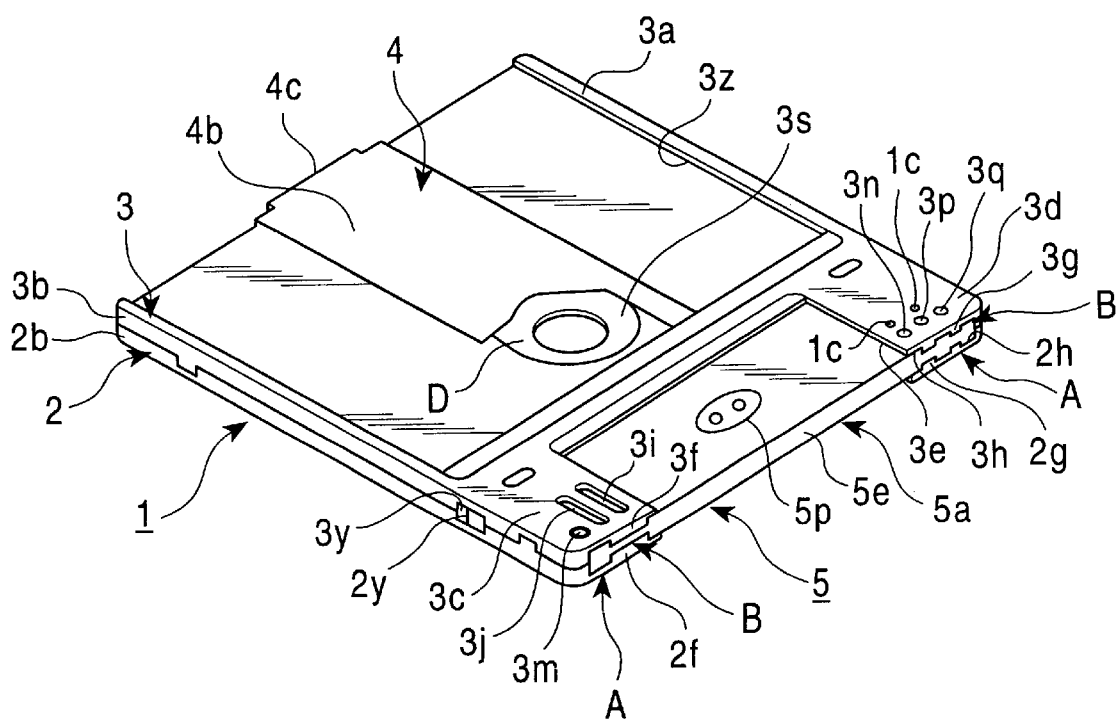
FIG. 2 is a perspective view of the optical disk cartridge according to the first embodiment of the present invention when it is turned upside down.

As will be understood from a comparison of FIG. 1 and FIG. 2, the top cover 2 differs from the bottom cover 3 in that a recessed part 2z is formed on the surface of the wall 2a of the top cover 2, in that a space 2f of the wall 2a is provided with a discrimination hole 2n for discriminating whether or not the information can be written on the disk D, a discrimination hole 2p for determining whether or not the checking for defective regions has been completed, and a blocking part-removing hole 2q, and in that a space 2g of the wall 2a is provided with operating slots 2i and 2j arranged side by side, and a breakable blocking part 2m consisting of a projection and having thin-walled parts 2k at the base portion thereof.

The top cover 2 and the bottom cover 3 constructed as described above are combined vertically to thereby form the casing 1.

Figure 3:
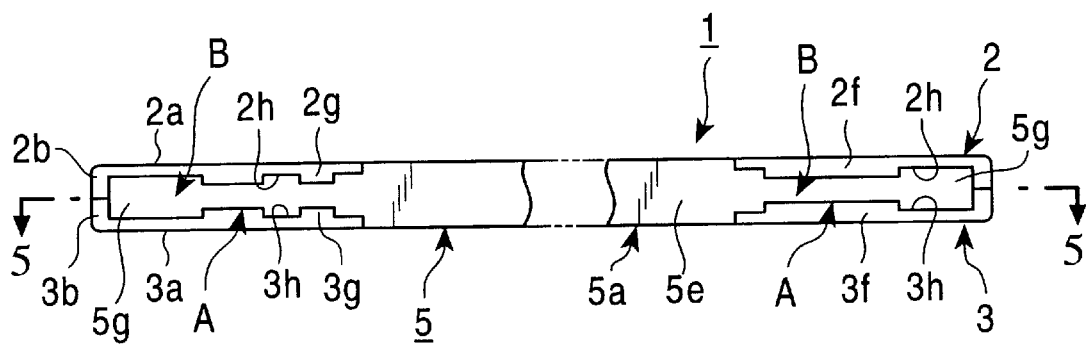
FIG. 3 is a front view of the optical cartridge according to the first embodiment of the present invention.
Figure 4:
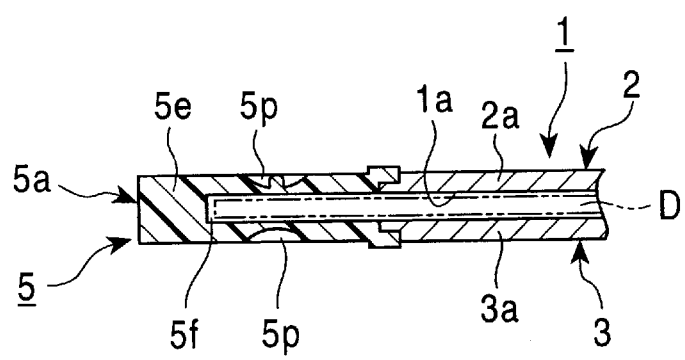
FIG. 4 is a sectional view taken along the line 4—4 in FIG. 1.

When the top and bottom covers 2 and 3 are combined, an accommodating section 1a for accommodating the optical disk D and the like is formed therebetween, and the incorrect-insertion-preventing sections A having recesses of different shapes are formed between the front walls 2f and 2g and 3f and 3g, as shown in FIG. 3.

In addition, when the top and bottom covers 2 and 3 are combined, the discrimination hole 2n of the top cover opposes a part of the operating slot 3i of the bottom cover 3, the discrimination hole 2p opposes a part of the operating slot 3j, and the hole 2q opposes the blocking part 3m on the right side of the casing 1, and the discrimination hole 3n of the bottom cover 3 opposes a part of the operating slot 2i of the top cover 2, the discrimination hole 3p opposes a part of the operating slot 2j, and the blocking part 2m opposes the hole 3q on the left side of the casing 1.

Closing parts 1b for closing the operating slots 3i and 3j are formed adjacent to the discrimination holes 2n and 2p of the wall 2a opposing the operating slots 3i and 3j, and closing parts 1c for closing the operating slots 2i and 2j are formed adjacent to the discrimination holes 3n and 3p of the wall 3a opposing the operating slots 2i and 2j.

Furthermore, when the top and bottom covers 2 and 3 are combined, a clamping window 2s and a reading and writing window 2t of the top cover 2 opposes the clamping window 3s and the reading and writing window 3t of the bottom cover 3, a rim 2v and regulating parts 2w of the top cover 2 abut against the rim 3v and the regulating parts 3w of the bottom cover 3, a space for holding the disk D is secured between bases 2x and 3x, and latching recesses 2y and 3y are formed in the side walls 2b and 3b.

A shutter 4 is made of a U-shaped metal plate and consists of a rectangular plate part 4a for closing the clamping window 2s and the reading and writing window 2t, a rectangular plate part 4b for closing the clamping window 3s and the reading and writing window 3t, and a connecting part 4c for connecting the plate parts 4a and 4b.

The connecting part 4c is located on the rear of the casing 1, the plate parts 4a and 4b are disposed in the recessed parts 2z and 3z so that the shutter 4 can move within the range of the recessed parts 2z and 3z.

Spring members (not shown) are placed in the spring receivers 2r and 3r, and the shutter 4 is normally located by the spring members at a neutral position to close the clamping windows 2s and 3s and the reading and writing windows 2t and 3t. When the shutter 4 is moved to the right side or the left side against the spring members, the shutter 4 opens the windows 2s, 3s, 2t, and 3t. When the biasing force to the shutter 4 is terminated, the shutter 4 is returned by the spring members to the neutral position again to close the windows 2s, 3s, 2t, and 3t.

As shown in FIGS. 16 to 19, a holder 5 which is a (molded article made of synthetic resin includes a base part 5a, a pair of elastic arms 5b provided at both ends of the base part 5a to accurately extend rearward, a pair of triangular projections 5c provided at the terminal ends of the elastic arms 5b, holding parts 5d projecting from the upper and lower surfaces of the elastic arms 5b near the terminal ends of the elastic arms 5b, an exposed part 5e continuously connected to the inner surfaces of the elastic arms 5b to form the base part 5a, and a groove 5f provided behind the exposed part 5e.

The elastic arms 5b have spring properties on the side of the disk D, i.e., in mutually opposing each other. The disk D is inserted into the groove 5f between the elastic arms 5b, the holding parts 5d hold a part of the upper and lower surfaces of the disk D, and the elastic arms 5b hold the left and right peripheries of the disk D.

Figure 16:
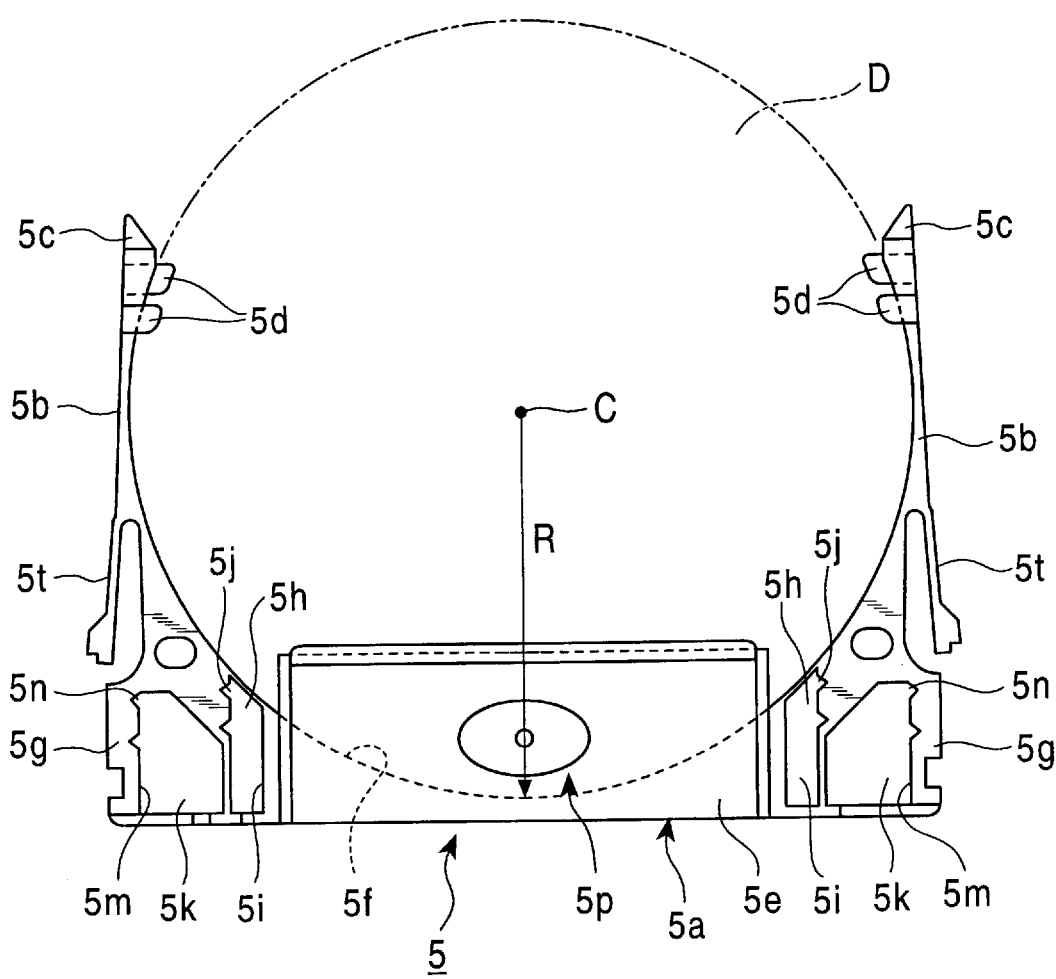
FIG. 16 is a plan view of a holder for the optical disk cartridge according to the first embodiment of the present invention.

In addition, as shown in FIG. 16, the elastic arms 5b extend rearward from the base part 5a while exceeding the size of the radius R of the disk D, and the holding parts 5d are formed at positions across the radius R of the disk D so as to hold the disk D at positions rearward of the center C of the disk D from the base part 5a.

Figure 5:
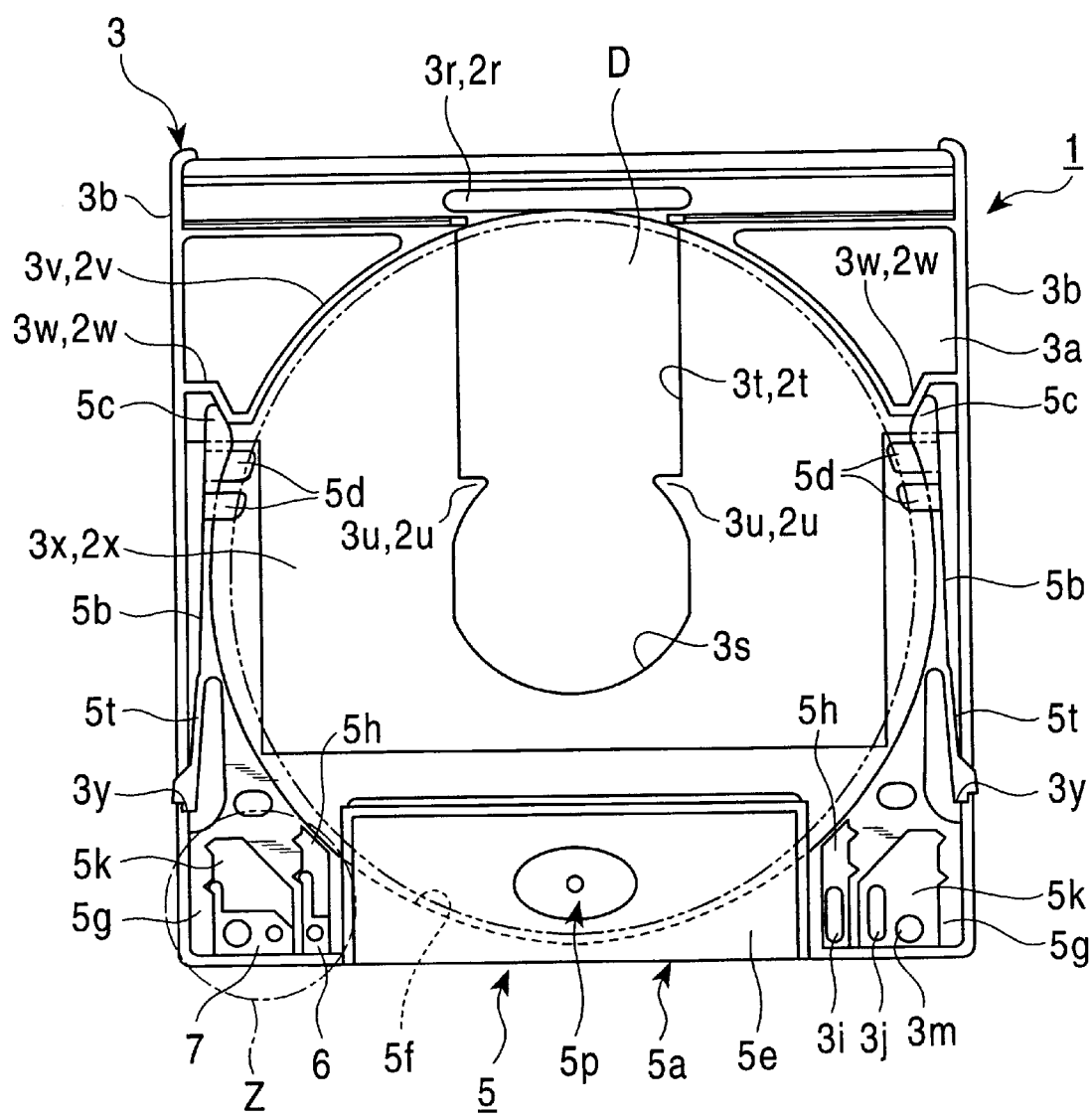
FIG. 5 is a sectional view taken along the line 5—5 in FIG. 3.

The holder 5 can be inserted into and removed from the accommodating section 1a with the disk D held by the elastic arms 5b. When the holder 5 is accommodated in the accommodating section 1a together with the disk D, the projections 5c abut against the regulating parts 2w and 3w, as shown in FIG. 5. When the holder 5 is further pushed in, the elastic arms 5b are spread out in a direction to separate from the peripheries of the disk D, whereby the holding of the peripheries of the disk D by the elastic arms 5b is released, and the deformation of the elastic arms 5c toward the disk D is prevented by the regulating parts 2w and 3w.

When the holder 5 is mounted in the casing 1, the exposed part 5e is located in the cutouts 2e and 3e so as to be exposed.

In removing the holder 5 from the casing 1, the elastic arms 5b separate from the regulating parts 2w and 3w and return toward the disk D due to the spring properties thereof to hold the disk D, whereby the holder 5 can be removed together with the disk D held thereby.

The holder 5 includes a pair of extended parts 5g located on both sides of the exposed part 5e to form a part of the base part 5a, a pair of first receiving parts 5h, each comprising a substantially rectangular hole, provided in the pair of extended parts 5g at positions equidistant from the widthwise central part of the holder 5, first guide parts 5i each consisting of side walls forming the receiving parts 5h, and a pair of V-shaped recesses 5j spaced apart in the first guide parts 5j.

The first receiving parts 5h coincide with the discrimination holes 2n and 3n provided in the top and bottom covers 2 and 3, respectively.

The holder 5 also includes a pair of second receiving parts 5k, each comprising a substantially rectangular wide hole, provided in the outside of the first receiving parts 5h at positions equidistant from the widthwise central part of the holder 5, second guide parts 5m each consisting of side walls forming the receiving parts 5k, and a pair of V-shaped recesses 5n spaced apart in the second guide parts 5m.

The second receiving parts 5k coincide with the discrimination holes 2p and 3p provided in the top and bottom covers 2 and 3, respectively, and blocking parts 2m and 3m.

In addition, the holder 5 includes identification marks 5p formed on top and bottom faces of the exposed part 5e. Each of the identification marks 5p consists of an elliptical recess 5q and a projection 5r provided on the recess 5q. As shown in FIGS. 20 to 25, one projection 5r is provided on the top face of the base part 5a, and two projections 5r are provided on the bottom face of the base part 5a so that top and bottom faces of each of the identification marks 5p can be identified tactilly.

Figure 17:
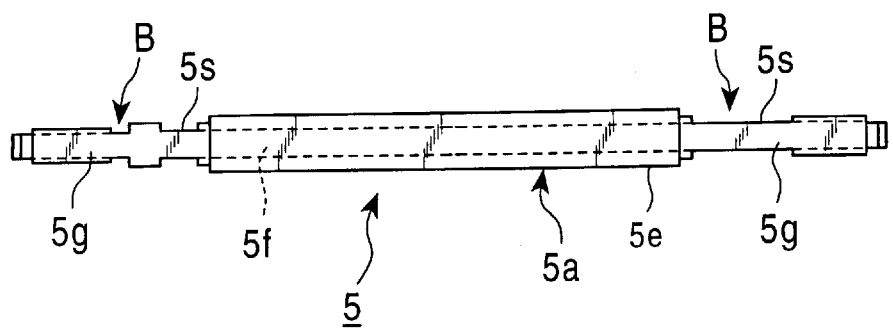
FIG. 17 is a front view of the holder.
Figure 18:
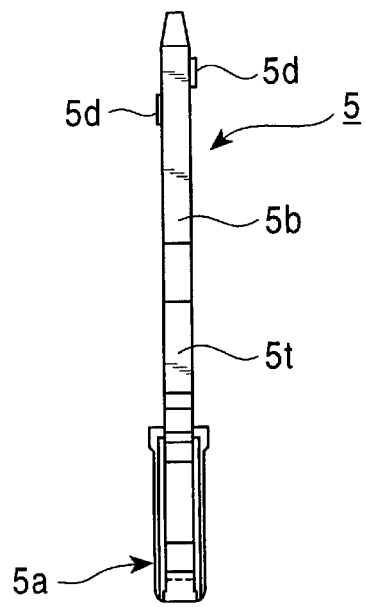
FIG. 18 is a side view of the holder.
Figure 19:
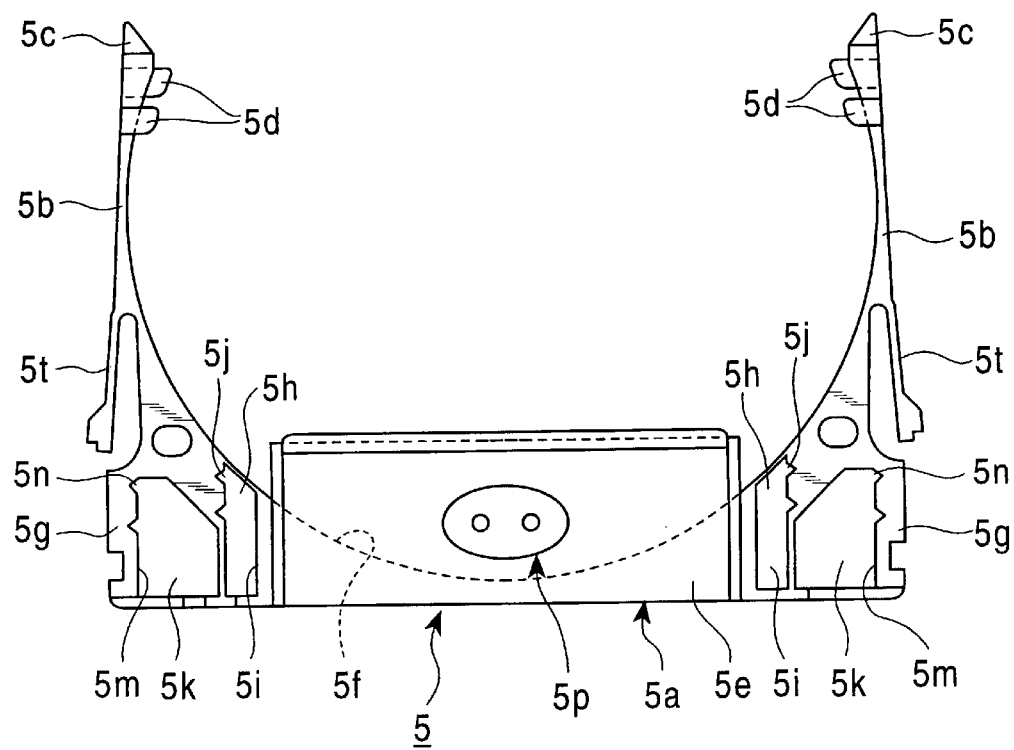
FIG. 19 is a rear elevation view of the holder.
Figure 20:
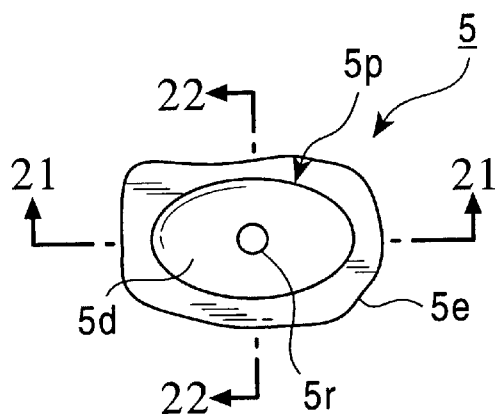
FIG. 20 is a partial view showing a principal part of the holder.
Figure 21:
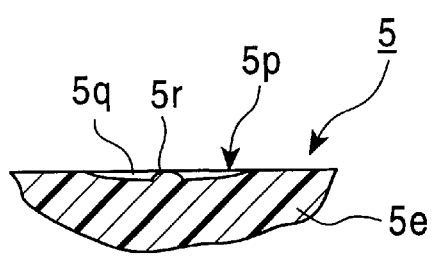
FIG. 21 is a sectional view taken along the line 21—21 in FIG. 20.
Figure 22:
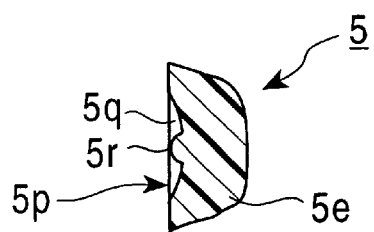
FIG. 22 is a sectional view taken along the line 22—22 in FIG. 20.
Figure 23:
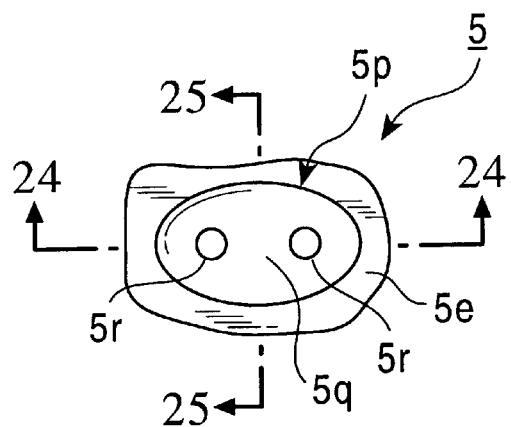
FIG. 23 is a partial view showing a principal part of the holder.
Figure 24:
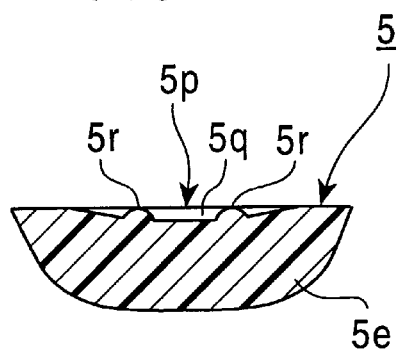
FIG. 24 is a sectional view taken along the line 24—24 in FIG. 23.
Figure 25:
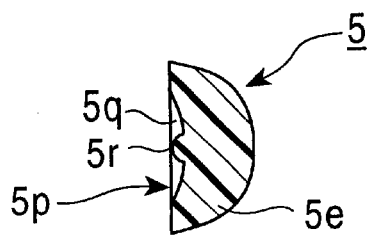
FIG. 25 is a sectional view taken along the line 25—25 in FIG. 23.

The holder 5 includes incorrect-insertion-preventing sections B provided on the extended parts 5g. The incorrect-insertion-preventing sections B have recesses 5s of different shapes provided in the left and right extended parts 5g, as shown in FIG. 17. The incorrect-insertion-preventing sections B of the holder 5 coincide with the incorrect-insertion-preventing sections A formed on the casing 1. If the holder 5 is turned upside down and an attempt is made to insert it into the casing 1, the incorrect-insertion-preventing sections A and B disenable the holder 5 being inserted into the casing 1.

The holder 5 includes a pair of locking parts 5t, each having spring properties, provided on both sides thereof. When the holder 5 is inserted into the accommodating section 1a of the casing 1, the latching parts 5t are inserted into the casing 1 in a state of elastically contacting the side walls 2b and 3b of the top and bottom covers 2 and 3, and when the latching parts 5t coincide with the latching recesses 2y and 3y, the latching parts 5t spread out due to the spring properties thereof to be latched in the latching recesses 2y and 3y, whereby the holder 5 is mounted in the casing 1.

In removing the holder 5 from the casing 1, the latching parts 5t are first pressed toward the inside of the casing 1 from the outside of the casing 1 to unlatch the latching parts 5t from the latching recesses 2y and 3y, and then the base part 5a of the holder is pulled out.

Figure 26:
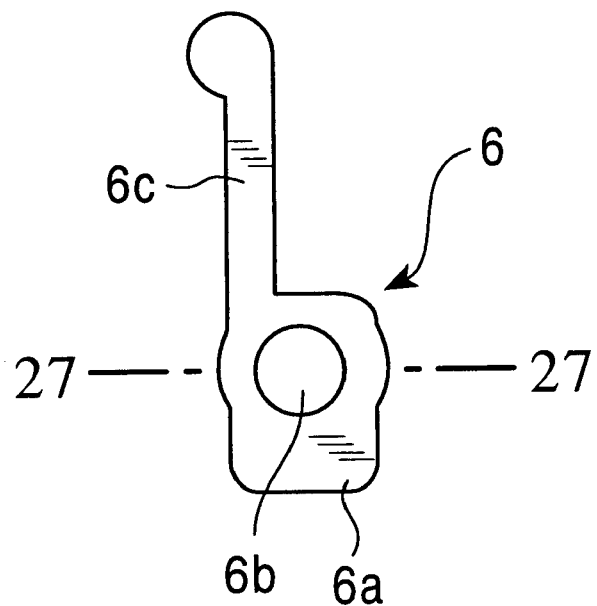
FIG. 26 is a plan view of the operation part of the optical disk cartridge.
Figure 27:
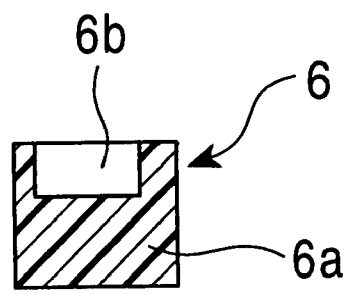
FIG. 27 is a sectional view taken along the line 27—27 in FIG. 26.

An operation part 6 which is a molded article made of synthetic resin includes a rectangular sealing part 6a, a recess 6b formed in the sealing part 6a, and an engaging part 6c having spring properties which extends from one end of the sealing part 6a, as shown in FIGS. 26 and 27.

The operation part 6 is accommodated by the holder 5 in the accommodating section 1a of the casing 1 in a state of being received in the first receiving part 5h so that the recess 6b opposes the operating slot 2i of the top cover 2, as shown in FIGS. 5 to 9.

When the operation part 6 is accommodated, the upper and lower surfaces of the operation part 6 are clamped by the top and bottom covers 2 and 3, side surfaces abut against the first guide 5i, and the engaging part 6c is engaged with the recess 5j.

That is, the operation part 6 is slidably mounted without entering into the operating slot 2i of the top cover 2 and the discrimination hole 3n of the bottom cover 3.

Figure 6:
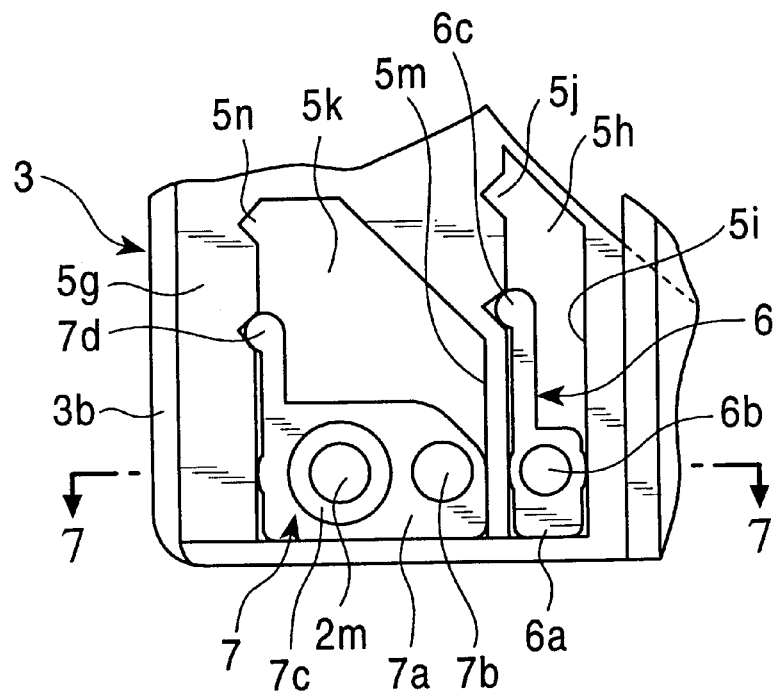
FIG. 6 is an enlarged view of a portion represented by Z in FIG. 5.
Figure 7:
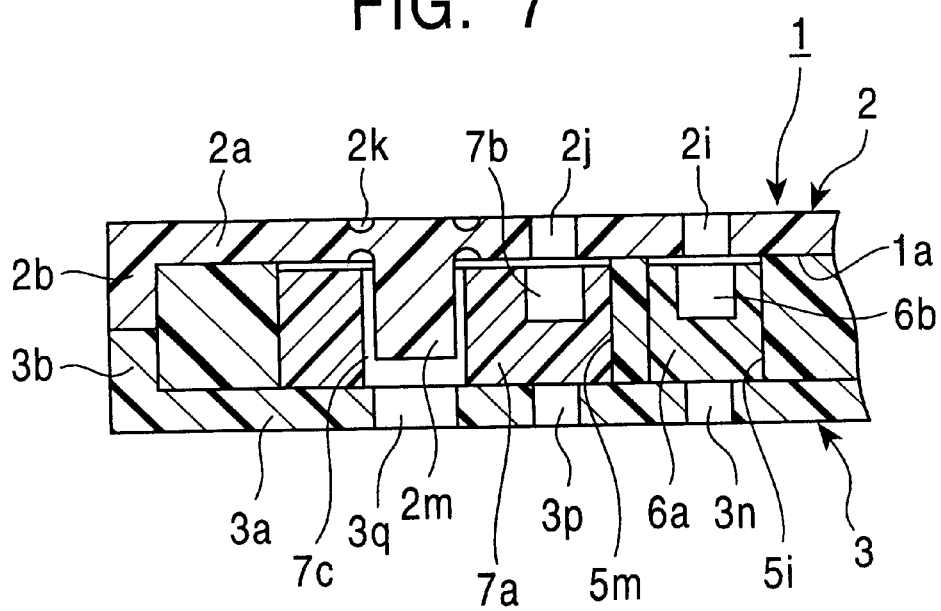
FIG. 7 is a sectional view taken along the line 7—7 in FIG. 6.
Figure 8:
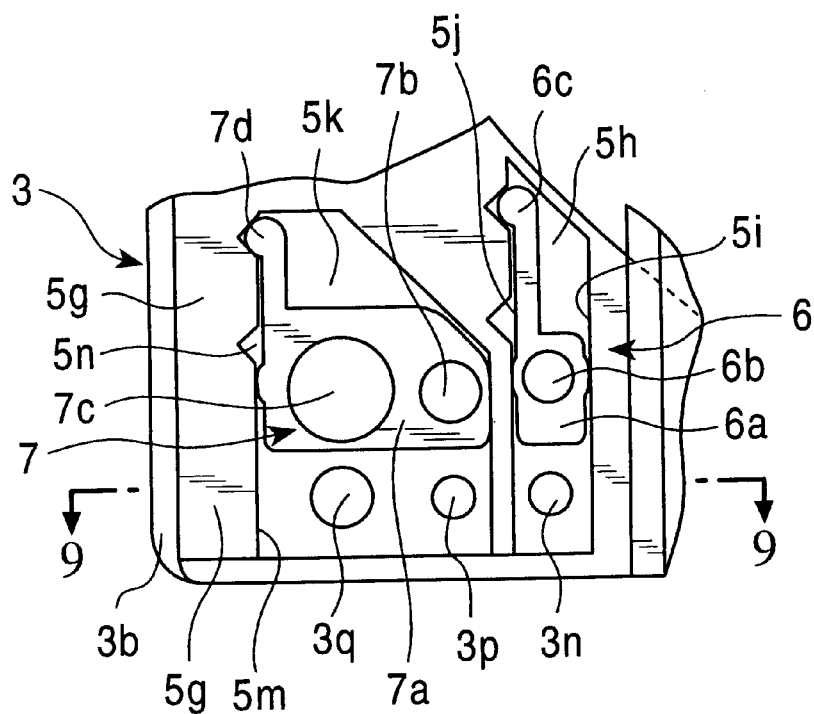
FIG. 8 illustrates movement of an operation part and an operation element of the optical disc cartridge according to the first embodiment of the present invention.
Figure 9:
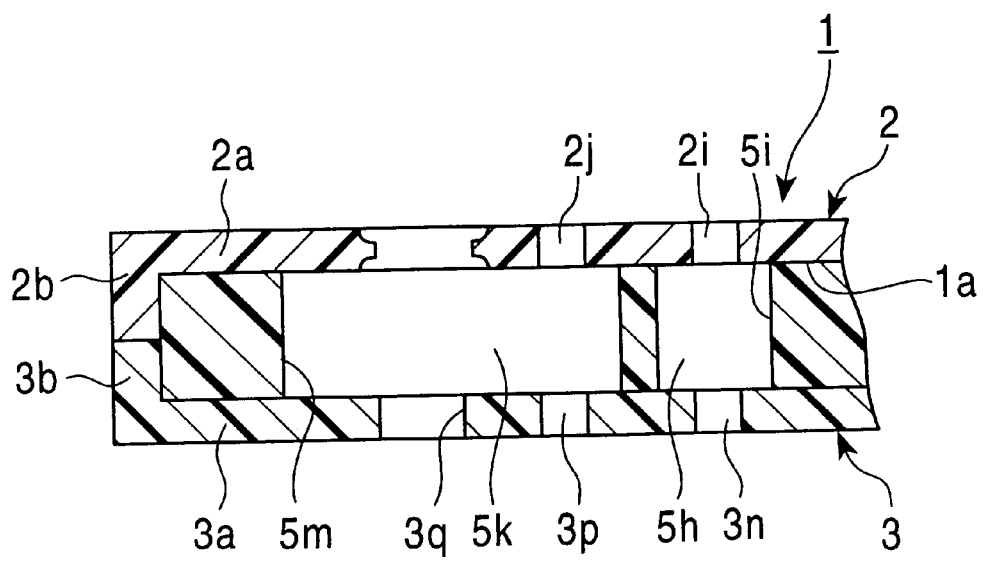
FIG. 9 is a sectional view taken along the line 9—9 in FIG. 8.

As shown in FIGS. 6 and 7, when the operation part 6 is at a position near the front of the casing 1, the discrimination hole 3n is closed by the sealing part 6a of the operation part 6 to prevent a detection pin (not shown), provided on the disk driving apparatus, from entering the discrimination hole 3n, whereby the information can be written on the disk D. When an operating tool (not shown) is passed through the operating hole 2i to be engaged with the recess 6b of the operation part 6, and the operation part 6 is slid along the operating slot 2i in the direction to separate from the front of the casing 1, the operation part 6 slides using the first guide part 5i as a guide and the engaging part 6c engages with another recess 5j, whereby the operation part 6 is positioned, as shown in FIGS. 8 and 9.

In this case, the sealing part 6a of the operation part 6 opens the discrimination hole 3n and enables the entry of the detection pin so as to protect the disk D from having information written thereon.

In this way, the sliding movement of the operation part 6 determines whether or not information can be written on the disk D.

The operation part 6 disposed on the left side of the casing 1 shown in FIG. 5 may be disposed on the right side of the casing 1. When the operation part 6 is disposed on the right side, as will be understood from FIGS. 1 and 2, the discrimination hole 2n is provided in the top cover 2 and the operating slot 3i is provided in the bottom cover 3. Therefore, the operation part 6 is disposed in a reversed state.

In this case, the disk D is used with the casing 1 turned upside down, as shown in FIG. 2, and whether or not information can be written on the disk D can be arbitrarily determined by selecting the top or the bottom side of the casing 1.

Figure 28:
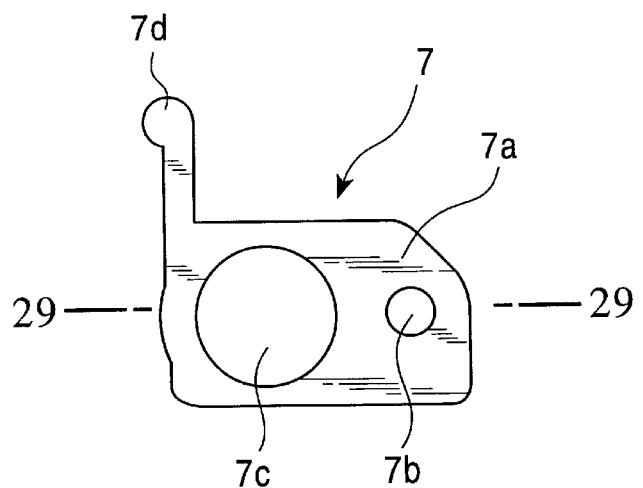
FIG. 28 is a plan view of the operation element of the optical disk cartridge.
Figure 29:
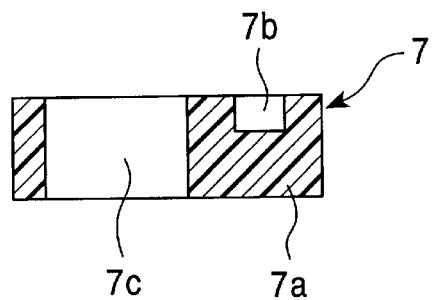
FIG. 29 is a sectional view taken along the line 29—29 in FIG. 28.
Figure 30:
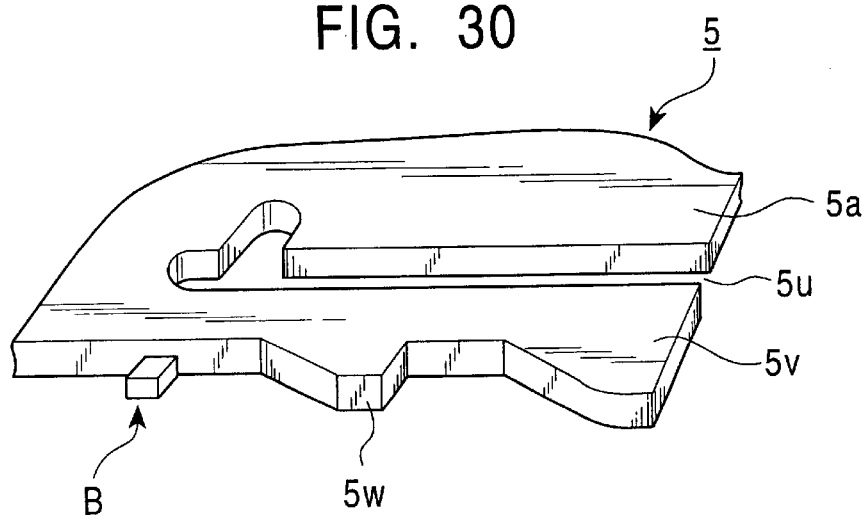
FIG. 30 is a perspective view showing a principal part of a holder of the optical disk cartridge according to a second embodiment of the present invention.
Figure 31:
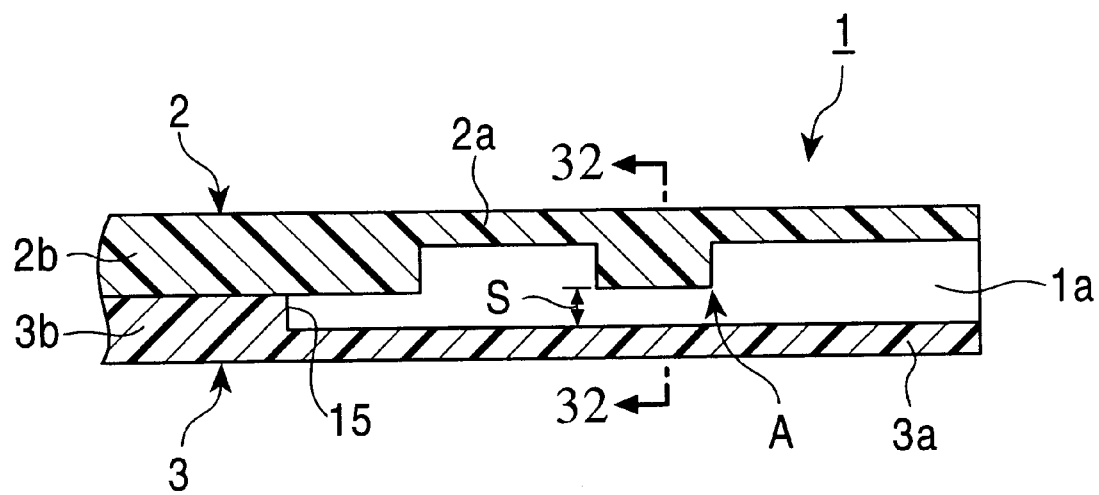
FIG. 31 is a sectional view showing a principal part of a casing of the optical disk cartridge according to a second embodiment of the present invention.
Figure 32:
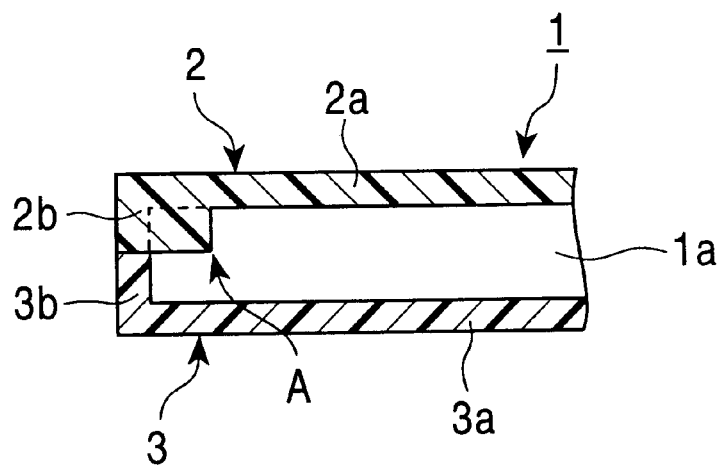
FIG. 32 is a sectional view taken along the line 32—32 in FIG. 31.

An operation element 7 which is a molded article made of synthetic resin includes a rectangular sealing part 7a, a recess 7b formed in the sealing part 7a, a through hole 7c formed in the sealing part 7a in parallel with the through hole 7b, and an engaging part 7d having spring properties which extends from one end of the sealing part 7a, as shown in FIGS. 28 and 29.

As shown in FIGS. 5 to 9, the operation element 7 is received in the receiving part 5k and is accommodated in the accommodating section 1a of the casing 1 in a state where the recess 7b opposes the operating slot 2j of the top cover 2, the blocking part 2m of the top cover 2 is inserted into the through hole 7c, and the through hole 7c opposes the hole 3q of the bottom cover 3.

When the operation element 7 is accommodated, the movement of the operation element 7 is blocked by the blocking part 2m, the holder 5 cannot be removed from the casing 1, the upper and lower surfaces of the operation element 7 are clamped by the top and bottom covers 2 and 3, side surfaces abut against the second guide part 5m, and the engaging part 7d is engaged with the recess 5n.

That is, the operation element 7 is mounted without entering into the operating slot 2j of the top cover 2 and the discrimination holes 3p and 3q of the bottom cover 3.

When the disk D is accommodated in the casing 1 and the movement of the operation element 7 is blocked by the blocking part 2m as described above, the checking for defective regions of the disk D has been completed.

As shown in FIGS. 6 and 7, when the operation element 7 is at a position near the front of the casing 1, the discrimination hole 3p is closed by the sealing part 7a of the operation element 7 to prevent the detection pin (not shown), provided on the disk driving apparatus, from entering the discrimination hole 3p so that the completion of the checking for defective regions of the disk D is detected.

The user, however, may desire to replace the disk D in the casing 1 with another disk D from necessity.

In this case, the blocking part 2m is first broken by the operation tool (not shown) from behind the hole 3p or the blocking part 2m so as to allow the holder 5 and the operation element 7 to be removed from the casing 1.

When the holder 5 is removed from the casing 1, the operation element 7 is pulled out by the second receiving parts 5k and the disk D is pulled out by the elastic arms 5b. After the replacement of the disk D with another disk D, the second disk D and the operation element 7 are accommodated again in the accommodating section 1a of the casing 1 together with the holder 5.

The accommodated second disk D is not subjected to checking for defective regions. Therefore, when the operation tool (not shown) is passed through the operating slot 2j to be engaged with the recess 7b of the operation element 7, and the operation element 7 is slid along the operating slot 2j in a direction to separate from the front of the casing 1, the operation element 7 slides using the second guide part 5m, and the engaging part 7d engages with another recess 5n, whereby the operation element 7 is positioned, as shown in FIGS. 8 and 9.

In this case, the sealing part 7a of the operation element 7 opens the discrimination hole 3p and enables the entry of the detection pin so as to determine that defective regions of the disk D have not been detected.

When a defective region of the disk D is detected by the disk driving apparatus in the state shown in FIG. 8, the casing 1 is removed from the disk driving apparatus, and the operation element 7 is slid by the operation tool so as to bring about the state shown in FIG. 6.

Thereafter, it is determined that the checking for defective regions of the disk D has been completed.

The operation element 7 disposed on the left side of the casing 1 shown in FIG. 5 may be disposed on the right side of the casing 1. When the operation element 7 is disposed on the right side, as will be understood from FIGS. 1 and 2, the discrimination hole 2p is provided in the top cover 2 and the operating slot 3j is provided in the bottom cover 3. Therefore, the operation element 7 is disposed in a reversed state.

In this case, the disk D is used with the casing 1 turned upside down, as shown in FIG. 2. Therefore, the blocking part 3m is broken so as to enable the movement of the operation element 7 and to determine whether or not the checking for defective regions has been completed.

The blocking parts 2m and 3m may be provided separately from the top and bottom covers 2 and 3.

In this case, holes 2q and 3q may be provided at the positions of the blocking parts 2m and 3m, and separate blocking parts 2m and 3m may be inserted into the holes 2p and 3q. Assembling of such a disk cartridge is completed by combining the top and bottom covers 2 and 3 to form the casing 1, by accommodating the disk D, the operation part 6, and the operation element 7 in the casing 1, and then by mounting the separate blocking parts 2m and 3m. This facilitates manufacture of the optical disk cartridge.

As described above, the optical disk cartridge can be accurately assembled by the incorrect-insertion-preventing sections A of the casing 1 and the incorrect-insertion-preventing sections B of the holder 5 at the time of replacement of the disk D, and the top and bottom faces of the holder 5 or the optical disk cartridge can be securely identified by the identification mark 5p when assembling the holder 5 or when using the optical disk cartridge.

Figure 10:
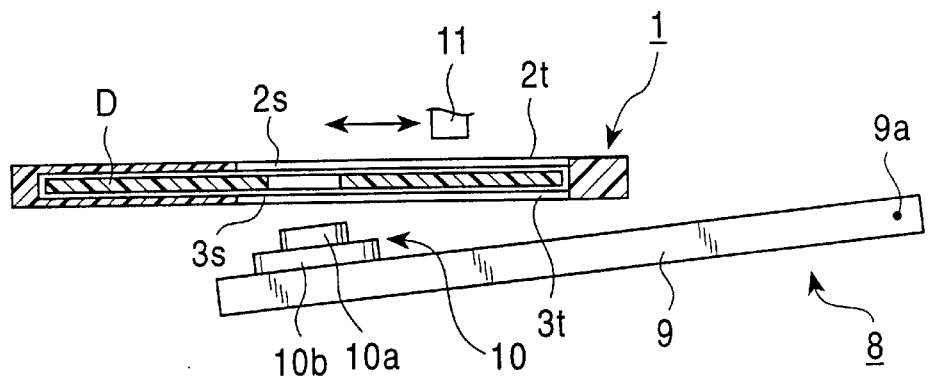
FIG. 10 illustrates the relationship between the optical disk cartridge according to the first embodiment and a disk driving apparatus according to the present invention.

When the optical disk cartridge constructed as described above is loaded on a disk driving apparatus 8, the shutter 4 is moved to open the clamping windows 2s and 3s and the reading and writing windows 2t and 3t, as shown in FIG. 10.

When the disk D is loaded, the detection pins (not shown) enter into the discrimination holes 3n and 3p, respectively, to determine whether or not information can be written on the disk D and whether or not the checking for defective regions has been completed. In addition, a table 9 is rotated about a fulcrum 9a to allow a spindle 10a of a motor 10 attached on the table 9 to be inserted into a hole of the disk D and to allow a hub 10b to abut against the face of the disk D, whereby the disk D is clamped.

An optical head 11 is moved in the vertical direction E shown in FIG. 11 with the disk D rotated by the motor 10 so as to write information on the disk D or read information from the disk D.

The outer diameter of the hub 10b generally ranges from 25 to 29 mm. In consideration of this, the width H of the clamping windows 2s and 3s in the horizontal direction F is ±2 mm of 27.4 mm. Moreover, since the hub 10b moves in a circle about the fulcrum 9a of the table 9, the diameter G of the clamping windows 2s and 3s in the vertical direction E is ±2 mm of 28 mm.

By enlarging the size of the clamping windows 2s and 3s in the vertical direction E, the hub lob can be prevented from colliding with the casing 1 during the circular motion thereof. In addition, by reducing the size of the clamping windows 2s and 3s in the horizontal direction F, the amount of movement of the shutter 4 can be secured.

A second embodiment of the optical disk cartridge of the present invention will now be described with reference to FIGS. 30 to 34.

A casing 1 includes an accommodating section 1a for accommodating a disk D and consists of a top cover 2 and a bottom cover 3, as in the case of the first embodiment.

Side walls 2a of the top cover 2 are provided with a pair of incorrect-insertion-preventing sections A, each consisting of a projection, located in the accommodating section 1a of the casing 1, and side walls 32 of the bottom cover 3 are provided with a pair of stopper recesses 15 at an inner part of the accommodating section 1a from the incorrect-insertion-preventing sections A. A space S is formed between the top of each of the incorrect-insertion-preventing sections A and the inner wall of a wall 3a of the bottom cover 3.

The incorrect-insertion-preventing sections A may be provided on the top cover 2, the stopper recesses 15 may be provided in the top cover 2, and the space S may be formed between the top of each of the incorrect-insertion-preventing sections A and the inner wall of the wall 2a of the top cover 2.

A holder 5 includes a base part 5a, a pair of elastic arms 5v formed with slits 5u so that there is elasticity on both sides of the base part 5a, a pair of incorrect-insertion-preventing sections B, each consisting of a projection, provided on a side portion of each of elastic arms 5v, and a pair of convex fallout-preventing sections 5w provided on a side portion of each of the pair of elastic arms 5v.

Figure 33:
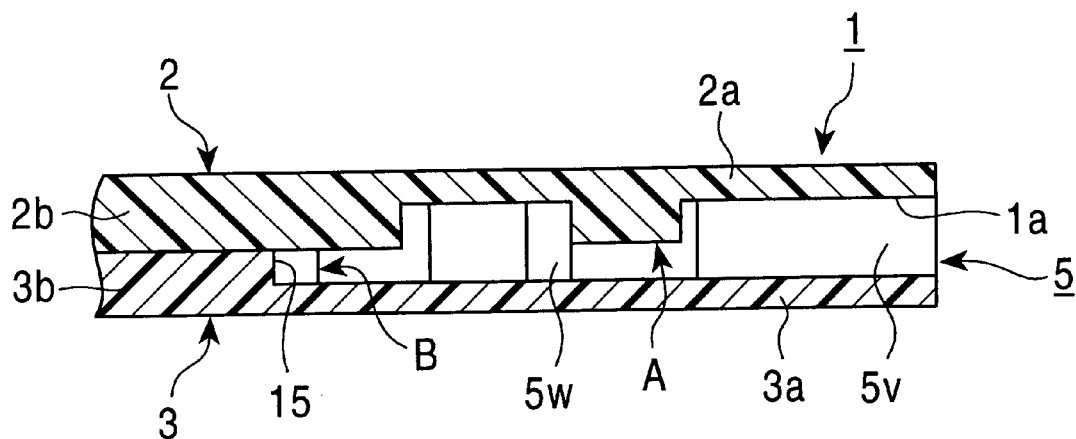
FIG. 33 is a sectional view showing a state where the holder is correctly inserted into the casing.
Figure 34:
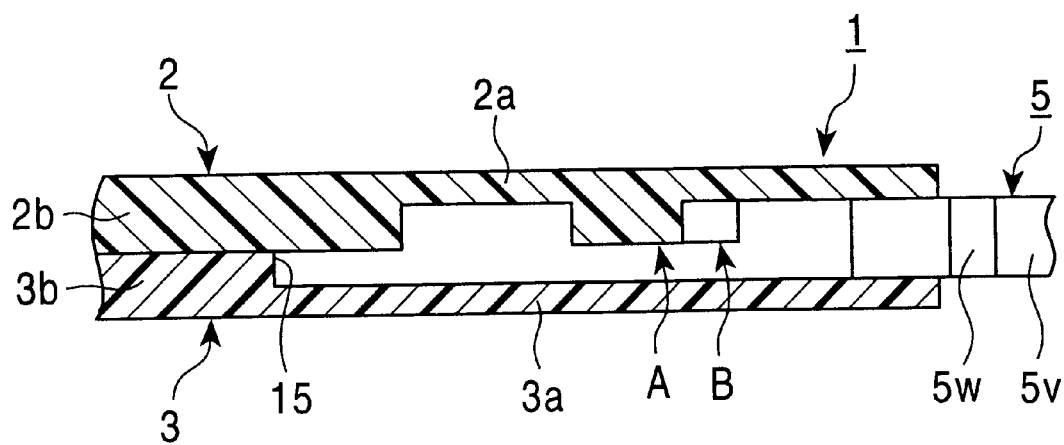
FIG. 34 is a sectional view showing a state where the holder is incorrectly inserted into the casing.
Figure 35:
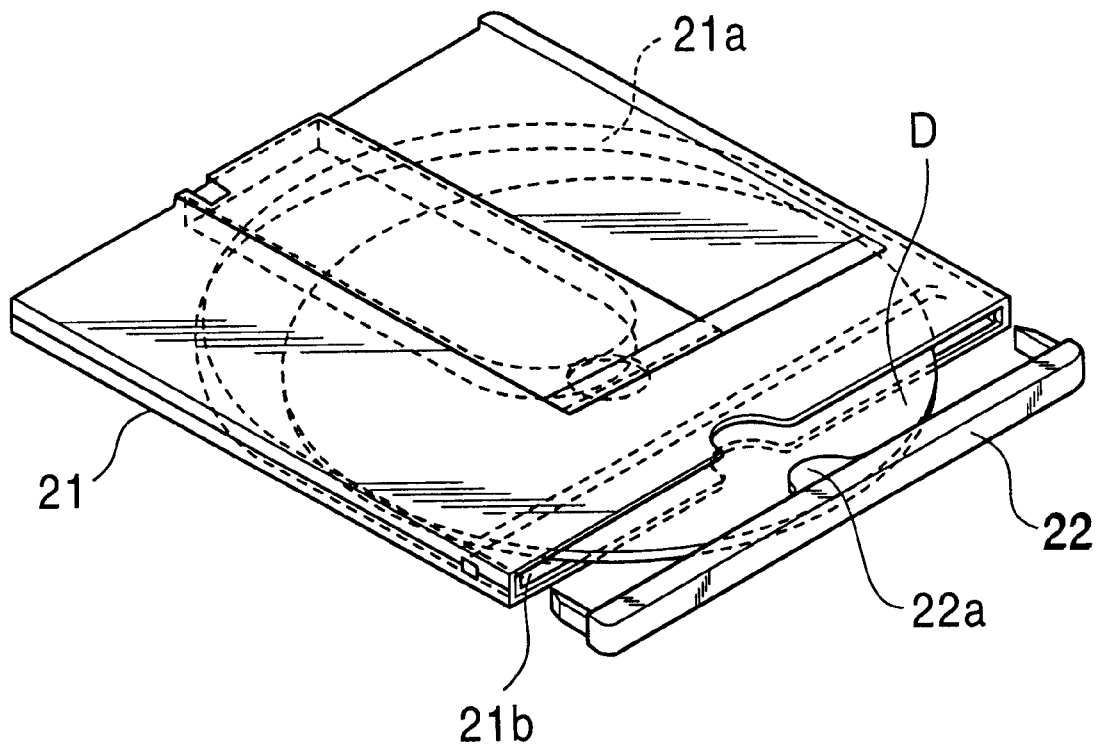
FIG. 35 is a partly exploded perspective view of a conventional optical disk cartridge.

When the holder 5 is correctly inserted into the casing 1, the incorrect-insertion-preventing section B does not engage with the incorrect-insertion-preventing section A, and the holder 5 can be inserted into an inner part of the accommodating section 1a through the space S, as shown in FIG. 33.

In the correct insertion of the holder 5 into the casing 1, the fallout-preventing sections 5w first abut against the incorrect-insertion-preventing sections B. When the holder 5 is further inserted, the elastic arms 5v are pressed in while deflecting inward, and the fallout-preventing sections 5w pass over the incorrect-insertion-preventing sections A to engage with the inner part of the incorrect-insertion-preventing sections A, thereby preventing the holder 5 from falling out of the casing 1. In addition, the incorrect-insertion-preventing sections B strike the stopper recesses 15 to prevent further insertion of the holder 5.

In removing the holder 5 from the casing 1, the fallout-preventing sections 5w are pressed from the outside of the side walls of the casing 1 to disengage the fall-out-preventing sections 5w and the incorrect-insertion-preventing sections A and then, the holder 5 is pulled out of the casing 1.

When the holder 5 is incorrectly inserted with the top and bottom faces reversed, the incorrect-insertion-preventing sections B of the holder 5 strike the incorrect-insertion-preventing sections A provided in the accommodating section 1a to block the insertion of the holder 5 into the casing 1, whereby incorrect insertion of the holder 5 can be prevented.

The optical disk cartridge of the present invention includes a casing having the accommodating section 1a, and the holder 5 capable of insertion and removal of the disk D into and from the accommodating section 1a while holding the disk D, and the holder 5 is provided with the incorrect-insertion-preventing sections B for preventing incorrect insertion of the holder into the casing with respect to top and bottom faces thereof. Therefore, the holder 5 can be securely and correctly inserted into the casing 1 with respect to top and bottom faces thereof, and the disk D can be correctly inserted with respect to top and bottom faces thereof.

The top and bottom faces of the optical disk cartridge of the present invention can be distinguished at a glance.

The incorrect-insertion-preventing sections A and B are formed by providing recesses in one of the holder 5 and the casing 1, and providing projections in the other of the holder 5 and the casing 1. Therefore, the construction of the optical disk cartridge can be simplified, and excellent manufacturing properties can be obtained.

The holder 5 has the base part 5a exposed from the casing 1, the incorrect-insertion-preventing sections B are provided on the base part 5a, the incorrect-insertion-preventing sections A are provided on the front wall of the casing 1, and the incorrect-insertion-preventing sections B are exposed from the casing 1 so as to be distinguished from the outside of the casing 1. Therefore, the direction of insertion of the disk D can be visually determined, and excellent assembly properties can be obtained. In particular, the optical disk cartridge is suitably used in the replacement of the disks D.

The incorrect-insertion-preventing sections A and B are formed using the side wall 2b of the casing 1 in the thickness direction. When an attempt is made to prevent the incorrect insertion of the holder 5 using the top face or the bottom face of the casing 1, the incorrect insertion may not be securely prevented due to the deflection of the top face or the bottom face. However, when the attempt to prevent the incorrect insertion of the holder 5 is made using the side wall 2b of the casing 1 in the thickness direction, the top surface or the bottom surface of the casing 1 does not deflect, and the incorrect insertion of the holder 5 can be securely prevented.

The incorrect-insertion-preventing sections A of the casing 1, each consisting of projection, are provided on the side walls located in the accommodating section 1a of the casing 1, and the incorrect-insertion-preventing sections B of the holder 5, each consisting of projection, are provided on the side portions of the holder 5. Therefore, the incorrect insertion of the holder 5 can be distinguished when the holder 5 is slightly inserted, the holder 5 is not fretted at the beginning of the insertion thereof, and excellent space factor is obtained.

The casing 1 has the top cover 2 and the bottom cover 3 forming top and bottom sides, the incorrect-insertion-preventing sections A of the casing 1 engageable with the incorrect-insertion-preventing sections B of the holder are provided on one of the top cover 2 and the bottom cover 3, the spaces S through which the incorrect-insertion-preventing sections B of the holder 5 are passable are provided between the tops of the incorrect-insertion-preventing sections A of the casing 1 and the top cover 2 or the bottom cover 3, and the holder 5 is prevented from being incorrectly inserted with respect to the top and bottom faces thereof by a state where the incorrect-insertion-preventing sections B of the holder 5 are passable through the spaces and a state where the incorrect-insertion-preventing sections B of the holder 5 engage with the incorrect-insertion-preventing sections A of the casing 1. Therefore, the construction of the optical disk cartridge can be simplified, excellent manufacturing properties can be obtained, and the optical disk cartridge is inexpensive. In addition, the incorrect insertion of the holder 5 can be distinguished after it is inserted by a certain degree, the holder 5 is not fretted at the beginning of the insertion thereof, and excellent space factor is obtained.

The holder 5 has the base part 5a, elastic arms 5v formed with slits so that there is elasticity on the base part 5a, and convex fallout-preventing sections 5w provided on the side portions of the elastic arms 5v, and the fallout-preventing sections 5w pass over the incorrect-insertion-preventing sections A of the casing 1 to engage with the incorrect-insertion-preventing sections A of the casing 1 to thereby prevent the holder 5 from falling out of the casing 1. Therefore, the structure of the fallout-preventing sections 5w is simplified, and the holder 5 can be securely prevented from falling out of the casing 1.

The casing 1 is provided with the stopper recesses 15 so that, in the insertion of the holder 5 into the casing 1, after the fallout-preventing sections 5w have passed over the incorrect-insertion-preventing sections A of the casing 1, the holder 5 abuts against the stopper recesses 15 so as to prevent further insertion of the holder 5. Therefore, damage of the disk D due to excessive insertion of the holder 5 can be prevented.

The incorrect-insertion-preventing sections B of the holder 5 abut against the stopper recesses 15 so as to prevent further insertion of the holder 5. Therefore, the construction of the optical disk cartridge can be simplified, the optical disk cartridge is inexpensive, and excellent space factor can be obtained.

The top and bottom faces of the base part 5a are formed with identification marks 5p for identifying top and bottom faces. Therefore, the top and bottom faces of the optical disk cartridge can be securely identified, and the cartridge can be conveniently used.

Each of the identification marks 5p is formed by a device for identifying the top and bottom faces tactilly. Therefore, the top and bottom faces of the cartridge can be identified tactilly.

Each of the identification marks 5p consists of an elliptical recess 5q, and projections 5r formed in the recess 5q with different numbers for the top and bottom faces.

Therefore, the construction of the cartridge can be simplified, the thickness of the cartridge can be reduced within the range of the thickness of the holder 5, and excellent productivity can be obtained.

What is claimed is:

1. An optical disk cartridge comprising:

a casing having an accommodating section to store a disk, the casing having incorrect-insertion-preventing abutment sections; and a holder including a pair of elastic arms, elastic portions, and an insertion end inserted into the accommodating section, the holder capable of insertion and removal of the disk in an inserting/removing direction into and from said accommodating section while holding the disk between the pair of elastic arms, each of the elastic portions having a base part and an outward-projecting fallout-preventing section, each base part having an outward-projecting incorrect-insertion-preventing protrusion displaced in a thickness direction, the outward-projecting fallout-preventing sections being formed more distal to the insertion end than the incorrect-insertion-preventing protrusions;

wherein the elastic portions are disposed at ends opposite to inserting ends of both sides of the holder extending along the inserting/removing direction with respect to the accommodating section, the incorrect-insertion-preventing abutment sections are formed at both side walls opposing against each of the elastic portions, the incorrect-insertion-preventing abutment sections permitting the incorrect-insertion-preventing protrusions to be fully inserted into the accommodating section by establishing an interval between the incorrect-insertion-preventing protrusions and the incorrect-insertion-preventing abutment sections in the thickness direction when an uninverted holder is inserted into the accommodating section and preventing an inverted holder from being fully inserted into the accommodating section by the incorrect-insertion-preventing protrusions abutting against the incorrect-insertion-preventing abutment sections, and when the holder is normally inserted, the fallout-preventing sections ride over the incorrect-insertion-preventing abutment sections while flexing the elastic portions, and upon complete insertion of the holder, the fallout-preventing sections are engaged with the incorrect-insertion-preventing abutment sections to prevent the holder from falling out of the accommodating section.

2. An optical disk cartridge according to claim 1, wherein said incorrect-insertion-preventing abutment sections are exposed from said casing and distinguishable from the outside of said casing.

3. An optical disk cartridge according to claim 2, wherein top and bottom faces of said base part are formed with identification marks for identifying top and bottom faces.

4. An optical disk cartridge according to claim 3, wherein each of said identification marks is formed by a means for identifying the top and bottom faces tactilly.

5. An optical disk cartridge according to claim 3, wherein each of said identification marks consists of an elliptical recess, and projections formed in said recess with different numbers for the top and bottom faces.

6. An optical disk cartridge according to claim 1, wherein said casing is provided with a stopper section so that, in the insertion of said holder into said casing, after said fallout-preventing section has passed over said incorrect-insertion-preventing section of said casing, said holder abuts against said stopper section so as to prevent further insertion of said holder.

7. An optical disk cartridge according to claim 6, wherein the incorrect-insertion-preventing section of said holder abuts against said stopper section so as to prevent further insertion of said holder.

* * * * *